United States Patent
White et al.

(10) Patent No.: US 7,928,814 B2
(45) Date of Patent: Apr. 19, 2011

(54) APPARATUS AND METHOD FOR SIGNAL LEVEL CONTROL

(75) Inventors: David G. White, Marion, IN (US);
Brian David Bajgrowicz, Grant, IN (US)

(73) Assignee: Thomson Licensing, Issy les Moulineaux (FR)

( * ) Notice: Subject to any disclaimer, the term of this patent is extended or adjusted under 35 U.S.C. 154(b) by 366 days.

(21) Appl. No.: 12/087,388

(22) PCT Filed: Jan. 4, 2007

(86) PCT No.: PCT/US2007/000142
§ 371 (c)(1),
(2), (4) Date: Jul. 1, 2008

(87) PCT Pub. No.: WO2007/081731
PCT Pub. Date: Jul. 19, 2007

(65) Prior Publication Data
US 2009/0079881 A1 Mar. 26, 2009

Related U.S. Application Data (60) Provisional application No. 60/756,103, filed on Jan. 4, 2006.

(51) Int. Cl.
*H01P 5/12* (2006.01)
(52) U.S. Cl. ........................... 333/1; 455/334
(58) Field of Classification Search ................. 333/17.1, 333/1, 100, 24 R, 129; 725/149, 151; 348/731; 455/150.1, 3.02, 334; 330/124 R
See application file for complete search history.

(56) References Cited

U.S. PATENT DOCUMENTS

| | | | |
|---|---|---|---|
| 6,545,564 B1 * | 4/2003 | Coppola | 333/124 |
| 6,579,242 B2 * | 6/2003 | Bui et al. | 600/537 |
| 6,614,299 B2 * | 9/2003 | Hirvilampi et al. | 330/124 R |
| 6,662,018 B1 * | 12/2003 | Kintis et al. | 455/522 |
| 6,909,323 B2 * | 6/2005 | Ueno et al. | 330/86 |
| 7,138,861 B2 * | 11/2006 | Sundstrom et al. | 330/124 R |
| 2003/0034838 A1 | 2/2003 | Fanous et al. | |

OTHER PUBLICATIONS
Search Report Dated May 15, 2007.

* cited by examiner

*Primary Examiner* — Robert Pascal
*Assistant Examiner* — Alan Wong
(74) *Attorney, Agent, or Firm* — Robert D. Shedd; Vincent E. Duffy; Michael A. Pugel

(57) ABSTRACT

A set top box is described including multiple tuners and an apparatus and method for controlling signal level. The apparatus includes a signal splitter for splitting signal power of a signal between an input and at least two outputs, a controller coupled to an output, and a circuit controlled by the controller and selectively coupled to the signal splitter for altering a signal transfer response characteristic of the signal. The method describes controlling the signal level of signals outputted by a signal splitter including determining a signal quality characteristic of one of the output signals and altering a signal response in the signal splitter in response to comparing the signal quality characteristic to a predetermined signal quality characteristic threshold.

18 Claims, 9 Drawing Sheets

APPARATUS AND METHOD FOR SIGNAL LEVEL CONTROL

This application claims the benefit under 35 U.S.C. §365 of International Application PCT/US2007/000142, filed Jan. 4, 2007, which was published in accordance with PCT article 21(2) on Jul. 19, 2007, in English and which claims the benefit under 35 U.S.C. §119 of a provisional application 60/756,103 filed in the United States on Jan. 4, 2006.

FIELD OF THE INVENTION

The present disclosure relates generally to a device and method for signal level control and more specifically toward a signal power splitter including a circuit and control for adjusting signal level.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Tuners and tuner systems, such as those used in satellite receiver set top boxes, have increasingly become more complex. For instance, multiple tuners can be used to simultaneously provide separate received signals to hard disk drives for recording and storage and to external display devices such as televisions as well as to other rooms in a home. Further, satellite service providers have increased capability by adding additional channel capacity as well as new signal modulation formats. The increased signal capability may require the tuners and tuner systems to operate with signals having a large variation in performance requirements and input conditions. The additional complexity and capability has subsequently strained the design requirements for the tuners and tuner systems.

In order to address the added complexity of using multiple tuners in a set top box, a signal power splitter is often used to provide the received signals to each individual tuner. However, simple signal power splitters can degrade the performance of the tuners and tuner system. In many cases the degradation results in performance that is unacceptable over the entire possible signal reception range, particularly given the added capability requirements.

One possible solution for splitting the input signal to more than one tuner in a set top box involves adding an extra amplifier to provide signal gain and attempt to overcome the performance degradation of the signal power splitter. In order to meet the performance requirements over all possible signal conditions using the extra amplifier, some form of signal level control of the signals provided to the individual tuners in the tuner system is required. As a result, the amplifier is typically a continuously variable gain amplifier.

The additional control necessary to operate a continuously variable amplifier further increases the complexity of the tuner system. In addition, variable gain amplifiers often introduce performance degradation of their own into the tuner system and are more costly than an alternative fixed gain amplifier. In order to address the issues with these increasing requirements on the tuner system, a solution is sought that permits a cost effective low complexity solution for controlling signal level in a tuner system over a wide range of signal requirements.

SUMMARY OF THE INVENTION

The disclosed embodiments relate to an apparatus and method for signal level control. In one embodiment, an apparatus includes a signal splitter for splitting the signal power of a signal between an input and at least two outputs, a controller coupled to an output, and a circuit controlled by the controller and selectively coupled to the signal splitter for altering a signal transfer response characteristic of the signal.

In another embodiment a method for controlling the signal level of signals outputted by a signal splitter includes determining a signal quality characteristic of one of the output signals and altering a signal response in the signal splitter in response to comparing the signal quality characteristic to a predetermined signal quality characteristic threshold.

In another embodiment a method for controlling the signal level of signaled outputted by a power splitter includes determining a first signal quality characteristic of one of the output signals, altering a signal response in the power splitter, determining a second signal quality characteristic of one of the outputs in response to altering the signal response, and comparing the first signal quality characteristic to the second signal quality characteristic and to a predetermined signal quality characteristic threshold.

The characteristics and advantages of the present disclosure may become more apparent from the following description, given by way of example.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following describes a circuit used for receiving satellite signals. Other systems utilized to receive other types of signals where the signal input may be supplied by some other means may include very similar structures. Those of ordinary skill in the art will appreciate that the embodiment of the circuits described herein is merely one potential embodiment. As such, in alternate embodiments, the components of the circuit may be rearranged or omitted, or additional components may be added. For example, with minor modifications, the circuits described may be configured to for use in non-satellite video and audio services such as those delivered from a cable network.

Figure 1:
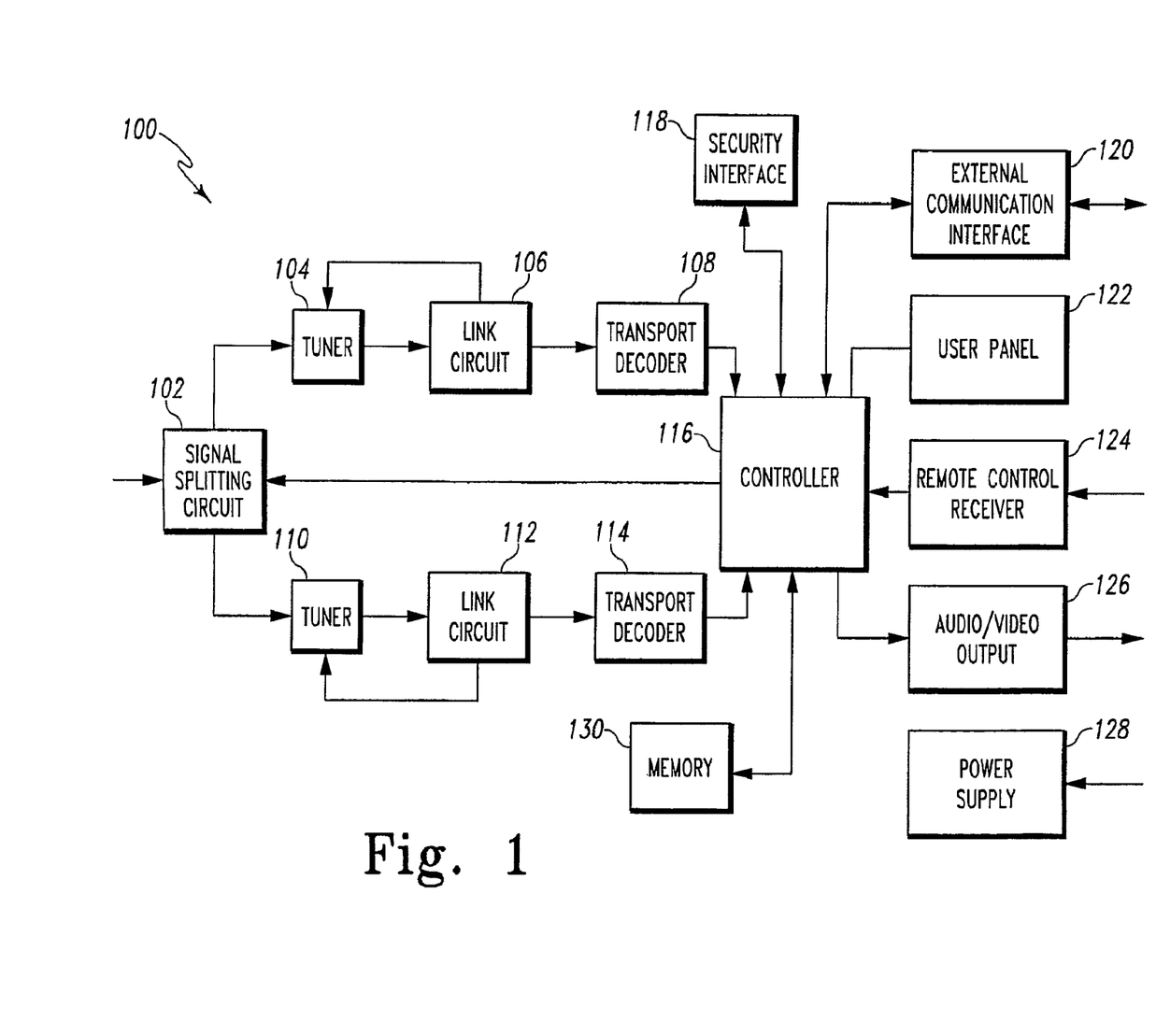
FIG. 1 is a block diagram of an exemplary system using an embodiment of the present invention.

Turning now to the drawings and referring initially to FIG. 1, an exemplary embodiment of a set top box 100 for receiving satellite signals using aspects of the present invention is shown. A signal stream containing a plurality of channels are delivered from an outdoor unit, not shown, to the signal splitting circuit 102 at the input of the set top box using a coaxial cable. The outdoor unit is configured to receive the signal stream from satellite transponders located on one or more satellites. In a preferred embodiment, two sets of sixteen channels are received by the outdoor unit, and converted to a frequency range of 950 to 2150 megahertz (MHz), referred to as L-band. The signal stream in the L-band frequency range is delivered to signal splitting circuit 102.

Signal splitting circuit 102 generates two split signal streams from the original signal stream. The two split signal streams contain identical content, and are generated by dividing the available signal power between the two split signal streams. Signal splitting circuit 102 may use electrical circuits such as amplifiers, resistors, capacitors, inductors, or other electromagnetic devices in order to accomplish the signal power dividing or splitting.

Each of the split signal streams is processed in a separate signal processing path. The upper signal path contains a tuner 104, a link circuit 106, and a transport decoder 108 with the signal path connected in a serial fashion. The lower path also contains a tuner 110, a link circuit 112, and a transport decoder 114 with the signal path also connected in a serial fashion. Each processing path may perform essentially identical signal processing on one of the split signal streams. Therefore only the upper signal processing path will be further described here.

One of the split signal streams from signal splitting circuit 102 is provided to tuner 104. Tuner 104 processes the split signal stream by selecting or tuning one of the channels in the split signal stream to produce one or more baseband signals. Tuner 104 contains circuits such as amplifiers, filters, mixers, and oscillators, for amplifying, filtering and frequency converting the split signal stream. Tuner 104 typically is controlled or tuned by either link circuit 106 or by another controller, such as controller 116 which will be described later. The control commands include commands for changing the frequency of an oscillator used with a mixer in tuner 104 to perform the frequency conversion.

Typically the baseband signals at the output of tuner 104 may collectively be referred to as the desired received signal and represent one satellite channel selected out of a group of channels that were received as the input signal stream. Although the signal is described as a baseband signal, this signal may actually be positioned at a frequency that is actually only near to baseband.

The one or more baseband signals from tuner 104 are provided to link circuit 106. Link circuit 106 typically contains the processing circuits needed to convert the one or more baseband signals into a digital signal for demodulation by the remaining circuitry of link circuit 106. In one embodiment the digital signal may represent a digital version of the one or more baseband signals. In another embodiment the digital signal may represent the vector form of the one or more baseband signals. Link circuit 106 also demodulates and performs error correction on the digital signal to produce a transport signal. The transport signal may represent a data stream for one program, often referred to as a single program transport streams (SPTS), or it may represent multiple program streams multiplexed together, referred to as a multiple program transport stream (MPTS).

Link circuit 106 also includes circuitry for characterizing the incoming baseband signal(s). Signal characterization is used to determine the signal quality of the incoming signal(s) and may include measurements at different points within the link circuit and control certain circuits within set top box 100. The signal characterization may include measurements of relative signal level, signal to noise ratio, or digital signal bit error rate. Additionally, if link circuit 106 contains an equalizer, characterization may include values derived from the equalizer elements.

In a preferred embodiment, the relative signal level is monitored as part of an automatic gain control loop for adjusting signal gain in tuner 104. A signal is provided from link circuit 106 to tuner 104 to adjust the signal gain in the tuner 104. The gain adjustment signal is based on link circuit 106 measuring the relative level of one or more baseband signals and integrating or smoothing the measured value over a time constant period of time. The smoothed value is compared to a threshold value and, if necessary, processed and provided to tuner 104 as the adjustment signal for a gain controllable amplifier in tuner 104.

The characterization of the signal quality is also used for determining the control signal for signal splitting circuit 102. The characterization information may be processed in link circuit 106 and may further be provided to controller 116 for additional processing.

The transport signal is provided to transport decoder 108. Transport decoder 108 typically separates the transport signal, which is provided as either a SPTS or MPTS, into individual program streams and control signals. Transport decoder 108 also decodes the program streams, and creates audio and video signals from these decoded program streams. In one embodiment, transport decoder 108 is directed by user inputs or through a controller such as controller 116 to decode only the one program stream that has been selected by a user and create only one audio and video signal corresponding to this one decoded program stream. In another embodiment, transport decoder 108 may be directed to decode all of the available program streams and then create one more audio and video signals depending on user request.

The audio and video signals, along with any necessary control signals, from both transport decoder 108 and transport decoder 114 are provided to controller 116. Controller 116 manages the routing and interfacing of the audio, video, and control signals and, further, controls various functions within set top box 100. For example, the audio and video signals from transport decoder 108 may be routed through controller 116 to an audio/video (A/V) output 126. A/V output 126 supplies the audio and video signals from set top box 100 for use by external devices such as televisions or computers. Also, the audio and video signals from transport decoder 114 may be routed through controller 116 to memory block 130 for recording and storage. Memory block 130 may contain several forms of memory including random access memory (RAM), flash, hard media such as a hard disk drive. Memory block 130 may include a memory section for storage of instructions and data used by controller 116 as well as a memory section for audio and video signal storage. Controller 116 may also allow storage of signals in memory block 130 in an alternate form such as an MPTS or SPTS from transport decoder 108 or transport decoder 114.

Controller 116 is also connected to an external communications interface 120 such as a phone modem for providing phone connection to a service provider. External communication interface 120 provides signals for authorizing the use of the audio and video signals. Controller 116 also connects to a security interface 118, such as a smart card, for communicating signals for managing the use of the audio/video signals and preventing unauthorized use. User control is accomplished through user panel 122, for providing a direct input of user commands to control the set top box and remote control receiver 124, for receiving commands from an external remote control device. Both user panel 122 and remote control receiver 124 are connected to controller 116. Although not shown, controller 116 may also connect to the tuners 104, 110, link circuits 106, 112, and transport decoders 108, 114 to provide initial set-up information as well as for passing control information between the blocks. Finally, power supply 128 typically connects to all of the blocks in set top box 100 and supplies the power to those blocks as well as providing power to any of the elements needing power externally, such as the satellite outdoor unit.

Controller 116 also provides a control signal to signal splitting circuit 102. The control signal may be determined based on characterization of signal quality performed in link circuit 106 or link circuit 112 from either of the signal processing paths. Controller 116 may process the signal characterization information to determine the setting of the control signal. Controller 116 may also compare the signal quality of each signal processing path in order to determine the setting for the control signal to signal splitting circuit 102. In addition, controller 116 may compare the signal quality values determined from either or both settings of the control signal provided to signal splitting circuit.

It should be appreciated by one skilled in the art that the blocks described inside set top box 100 have important interrelations, and some blocks may be combined and/or rearranged and still provide the same basic overall functionality. For example, transport decoder 108 and transport decoder 114 may be combined and further integrate some or all of the functions of controller 116 to act as the main controller for set top box 100. Further, control of various functions may be distributed or allocated based on specific design applications and requirements. For example, the processing paths for the two split signal streams may operate for specific types of signals. Tuner 104, link circuit 106, and transport decoder 108 may receive, demodulate, and decode signals employing a high definition audio and video format while tuner 110, link circuit 112, and transport decoder 114 may receive signals for maintaining the operation of a program guide. In this arrangement, control for signal splitting circuit 102 may be provided from link circuit 106 based solely on performance requirements and signal characterization of the signal path producing high definition audio and video signals.

Figure 2:
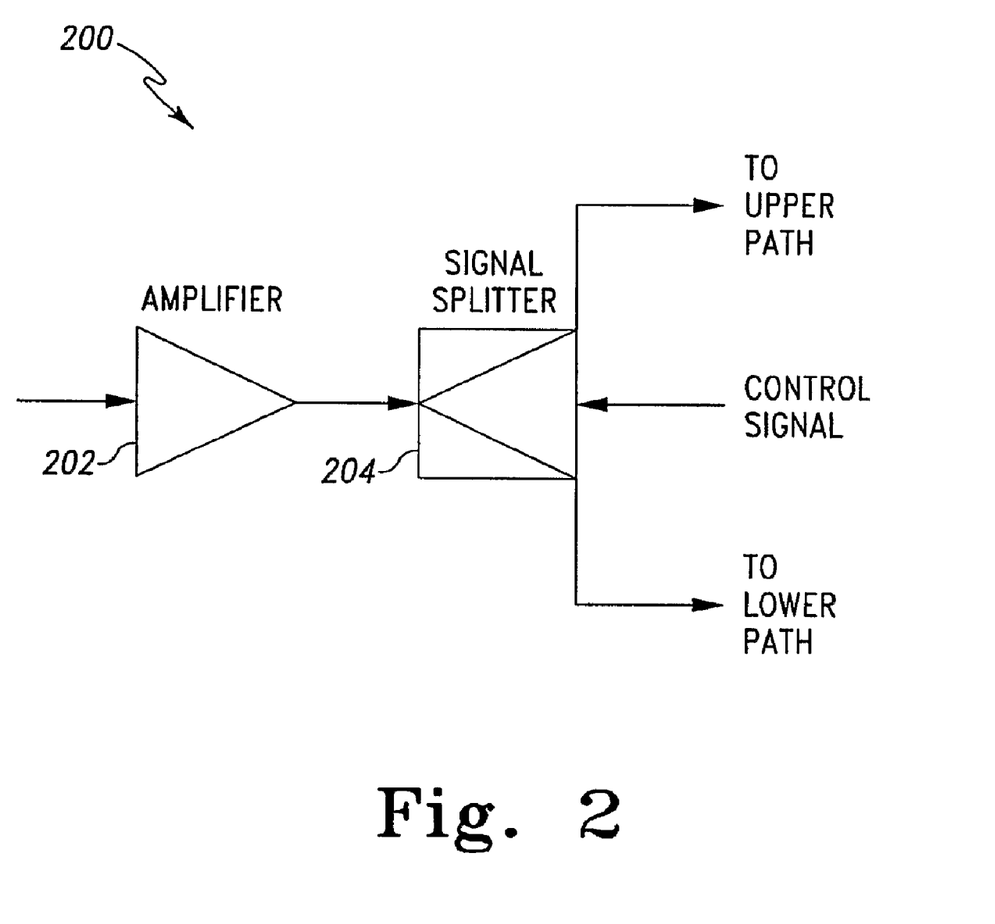
FIG. 2 is a block diagram of an embodiment of the present invention.

Turning to FIG. 2, an exemplary embodiment of a signal splitting circuit 200 using aspects of the present invention is shown. Signal splitting circuit 200 performs the same overall functionality as signal splitting circuit 102 within set top box 100 shown in FIG. 1. The input signal stream is provided to amplifier 202. Amplifier 202 increases the signal level or signal power of the incoming signal by providing signal gain or power gain to the incoming signal stream. Amplifier 202 increases the signal power to overcome signal losses due to other equipment and cabling used for getting the signal stream to a set top box that result in a lower signal level or signal power. Amplifier 202 may also increase the signal power to overcome signal losses that are inherent in the process of dividing or splitting the incoming signal stream. In a preferred embodiment, amplifier 202 provides approximately 13 decibels (dB) of signal gain relative to the signal level of the incoming signal stream.

In addition to signal gain, the amplifier may also produce undesired performance artifacts such as additional noise commonly known as noise figure, distortion, and gain taper. Performance levels of each of these parameters may primarily be controlled through design choice of the particular amplifier as is well known to those skilled in the art. However, it is important to note that a fixed gain amplifier as described here, particularly an amplifier with only a moderate amount of signal gain such as 13 dB, will achieve better performance levels than an alternative variable gain amplifier. In addition, an amplifier with moderate gain will also possess a more uniform amount of signal gain over the frequency range, or less gain taper, for the incoming L-band frequency signal stream.

The amplified signal stream is provided to power splitter 204. Power splitter 204 generates two split signal streams from the amplified signal stream. Power splitter 204 may use several known circuits for splitting signal power such as a multiple winding transformer employing electromagnetic principles or a particular arrangement of resistors or other electrical impedance devices. In a preferred embodiment, power splitter 204 uses an arrangement of three resistors for generating the split signal streams. One divided signal output connects to the first signal path including tuner 104, link circuit 106, and transport decoder 108 shown in FIG. 1. The other divided signal output connects to the second signal path including tuner 110, link circuit 112, and transport decoder 114 also shown in FIG. 1.

Each of the two split signal streams created by the passive type circuit described above necessarily contain less signal power than the amplified signal stream at the input to power splitter 204. The division or split of power between the two split signal streams may or may not be equal. However, the sum total of signal powers of the two split signal streams must necessarily be equal to or less than the signal power of the amplified signal at the input of power splitter 204.

Power splitter 204 may also include other active signal components such as transistors and diodes in addition to, or instead of, the passive components described above. The active signal components may allow power splitter 204 to operate without the constraints on the sum total of signal powers described above.

Power splitter 204 also includes a control signal input. The control signal is provided from, for instance, controller 116 described previously. The control signal allows circuitry included within power splitter 204 to be connected or disconnected in order to adjust the performance of the splitter. For example, resistors, capacitors, and inductors may be included and connected in a manner that alters the signal transfer response characteristic of power splitter 204. The signal transfer response characteristic, or transfer response, represents the relation of the signal present at the outputs of power splitter 204 to the signal present at the input of power splitter 204. The additional circuitry with power splitter 204 may produce an altered signal transfer response characteristic relative to a nominal signal transfer response characteristic in the absence of the additional circuitry.

Figure 3:
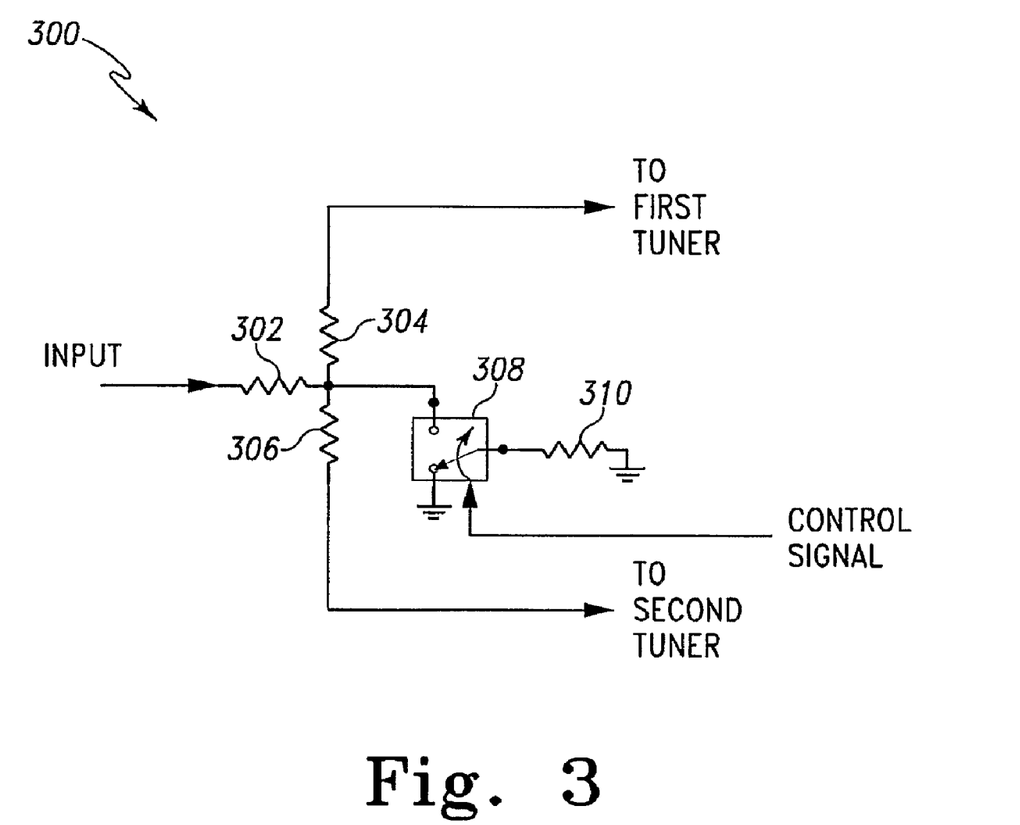
FIG. 3 is a circuit diagram of an embodiment of the present invention.

Turning to FIG. 3, a circuit diagram of an exemplary embodiment of a power splitter 300 using aspects of the present invention is shown. An input signal, such as the amplified signal stream described previously, is provided to one terminal of resistor 302. Resistor 302 is part of a resistor network also including resistor 304 and resistor 306 collectively forming a resistive signal power splitter. Power splitters using resistors, as described previously, allow the input signal to be split into two output signal paths, each path introducing some signal power loss. Further, a resistive splitter allows the input and output connections to present a nominal input and output resistance or impedance and also provide some isolation between each of the input and output; connections. The resistance values for resistor 302, resistor 304, and resistor 306 are typically a matter of design choice. In a preferred embodiment, resistor 302 has a value of 20 ohms, resistor 304 has a value of 20 ohms resistor 306 has a value of 20 ohms. The resistive splitter formed by this network of resistors results in approximately 6 dB of signal power loss for each split signal stream at each output in relation to the signal power at the input terminal of resistor splitter at resistor 1. In addition, the resistive splitter network provides and maintains approximately a 75 ohms input and output impedance over the L-band frequency range of the signal stream.

Resistor 302, resistor 304, and resistor 306 are connected together with one terminal of each resistor connected at a common node. The other terminal of resistor 304 is connected to the signal processing path for one split signal stream as an output. The other terminal of resistor 306 is connected to the signal processing path for the other split signal stream as an output.

Switch 308 connects a circuit for altering the transfer response of resistive splitter network formed by resistor 302, resistor 304, and resistor 306. Switch 308 preferably includes two selectable connection or switch terminals and a common terminal in an arrangement commonly known as a single pole double throw (SPDT) arrangement. In a preferred embodiment, switch is a gallium arsenide field effect transistor (GaAsFET) SPDT device. Switch 308 may also utilize other components such as a PIN diode or an electromagnetically controlled relay switch. Preferably, switch 308 provides very low resistance impedance connection between the connected terminal and the common terminal in the "on" state. Switch 308 also provides a high level of signal isolation between the nonconnected terminal and the common terminal in the "off" state as well as high isolation between the connected and nonconnected terminals.

One switch terminal of switch 308 is connected to the common node connecting resistor 302, resistor 304 and resistor 306 together. The other switch terminal of switch 308 is connected to ground. The common terminal of switch 308 is connected to the circuit used for altering the signal transfer response characteristic of the resistive splitter network from its nominal transfer response. In one embodiment, the common terminal of switch 308 is connected to resistor 310. The other terminal of resistor 310 is connected to ground. The resistance value of resistor 310 is 50 ohms.

Switch 308 also contains a control signal input, provided from a device such as controller 116 described previously. The control signal is used to control the switch state of switch 308. The switch state of switch 308 determines which selected terminal of switch 308 is connected to the common terminal.

Other circuit components may also be present, although not shown here, in order to introduce, pass, or exclude other signals such as DC power signals, in the electrical circuit. For example, capacitors for blocking DC signals may be included in series with resistor 302, resistor 304, and resistor 306. These circuit components may be incorporated as necessary as is well known to those skilled in the art In a preferred mode of operation, when the control signal to switch 308 indicates that nominal operation of the resistive splitter network is used, switch 308 connects the lower switch terminal to the common terminal connecting both terminals of resistor 310 to ground. Resistor 310 is not connected into the resistive splitter network formed by resistor 302, resistor 304, and resistor 306. As a result, the transfer response of the resistive splitter network operates in a normal manner.

However, when the control to switch 308 indicates that an altered operation of the resistive splitter network is used, switch 308 connects the upper switch terminal to the common terminal connecting resistor 310 to the common node connection of resistor 302, resistor 304, and resistor 306. The added circuit including resistor 310 connected to the resistive splitter network alters the signal transfer response characteristic of the resistive splitter network by increasing the signal power loss. The addition of resistor 310, having a value of 50 ohms, to the resistive splitter network results in approximately 9 dB of additional signal power loss for each split signal stream. A nominal input and output impedance of approximately 75 ohms remains despite the addition of resistor 310.

Figure 4:
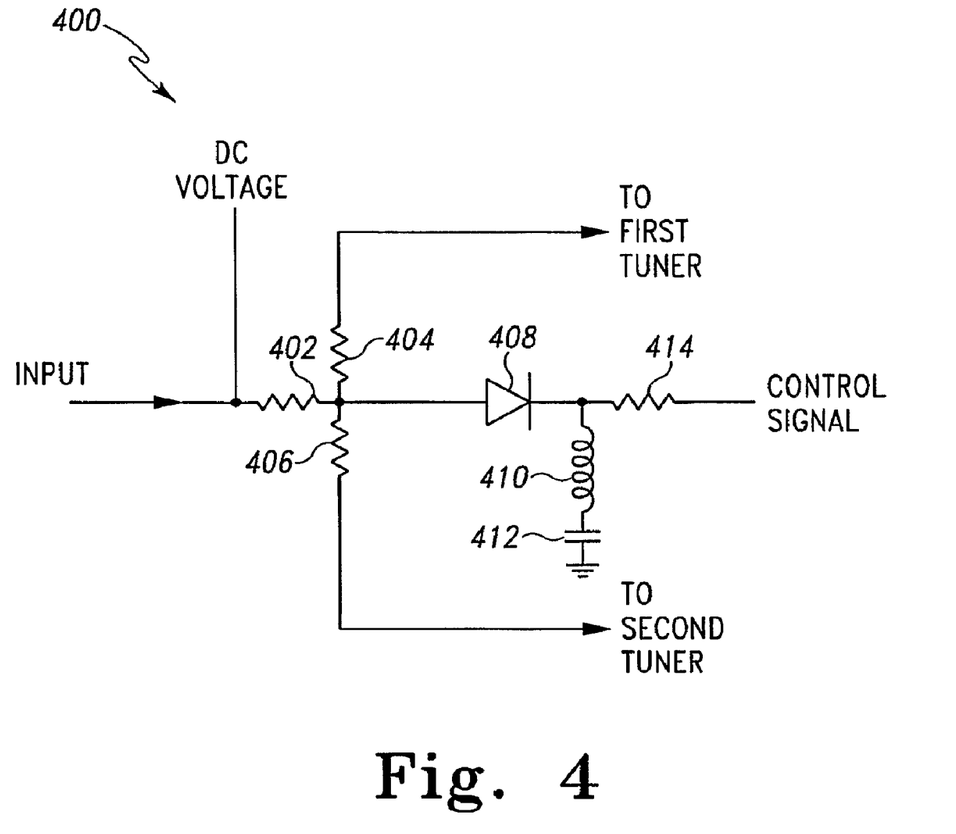
FIG. 4 is a circuit diagram of another embodiment of the present invention.

Turning to FIG. 4, a circuit diagram of another exemplary embodiment of a power splitter 400 using aspects of the present invention is shown. The connection and function of resistor 402, resistor 404 and resistor 406 forming a resistive splitter are similar to the resistors described in FIG. 3 and as such will not be further described here. The switching function is accomplished using diode 408. Diode 408 is a pin diode preferably having the characteristics of very low series resistance in the forward biased condition and very high series impedance resulting in high isolation in the reverse biased condition. Anode of diode 408 is connected to the common node connecting resistor 402, resistor 404, and resistor 406. Cathode of diode 408 is connected to the transfer response altering circuit, one terminal of inductor 410. The other terminal of inductor 410 is connected through capacitor 412 used to a block for DC signals, to ground. Cathode of diode 408 is also connected to one terminal of resistor 414. The other terminal of resistor 414 is connected to the control signal path provided for instance, by controller 116 described previously. An additional connection to a DC voltage source at a voltage level less, than a voltage "high" level logic voltage, such as two volts, is connected to the terminal of resistor 402 common with the input signal. As before, additional components may be added to prevent, introduce, or pass signals such % as DC signals as is well known to those skilled in the art.

By introducing inductor 410 as the transfer response altering circuit, a high pass filter response may be introduced into the resistive splitter network. The value of inductance for inductor 410 is a matter of design choice. In a preferred embodiment, the inductance value is approximately 1.5 nanohenries (nH). In a real implementation, realization of such a small value inductance may be accomplished using the intrinsic inductance of other components such as diode 408 and capacitor 413 as well using traces of copper on a printed circuit board as is well known to those skilled in the art. As a result: of introducing inductor 410 as the transfer response altering element, the signal level of each signal passing through the different paths in the resistive splitter network formed by resistor 402, resistor 404, and resistor 406 variably changed over the L-band signal frequency range. For example the signal level at 950 MHz is approximately 22 dB lower than the signal level at 1950 MHz, relative to signal levels at the input.

In a preferred mode of operation, when the control signal from controller 116 indicates that nominal operation is used, a control signal representing a logic level high voltage, for example 3.3 volts, is provided to resistor 414. The high voltage connected to the cathode of diode 408 combined with the lower DC voltage applied to anode of diode 408 through resistor 402 puts diode 408 in a reverse bias condition. The reverse bias condition allows diode 408 to present a high impedance to the common node of the resistor network effectively preventing the transfer response altering circuit, inductor 410, from altering the nominal signal transfer response characteristic of the resistive splitter network formed by resistor 402, resistor 404, and resistor 406.

However, when the control signal from controller 116 indicates that altered operation is used, a control signal representing zero voltage is provided to resistor 414. The zero voltage acts as a virtually ground and, in combination with the DC voltage applied to the anode of diode 408, allows diode 408 to be placed into a forward bias condition. Bias current flows from the DC supply through resistor 402 and into diode 408. The current flows out of diode 408 and through resistor 414 and into the virtual ground of the control signal path to controller 116 which acts as a current sink. The forward biased diode 408 presents a very small resistance in series with inductor 410 effectively connecting inductor 410 to the resistive splitter network at the common node connecting resistor 402, resistor 404, and resistor 406.

Although the diagrams have illustrated single elements introduced as circuits for altering the signal transfer response characteristic of a resistive splitter network, multiple elements may be used. For instance, it may be possible to add a resistor in parallel with an inductor in order to alter the transfer response with both a high pass filter response as well as an added signal power level reduction over the entire signal frequency range.

Figure 5:
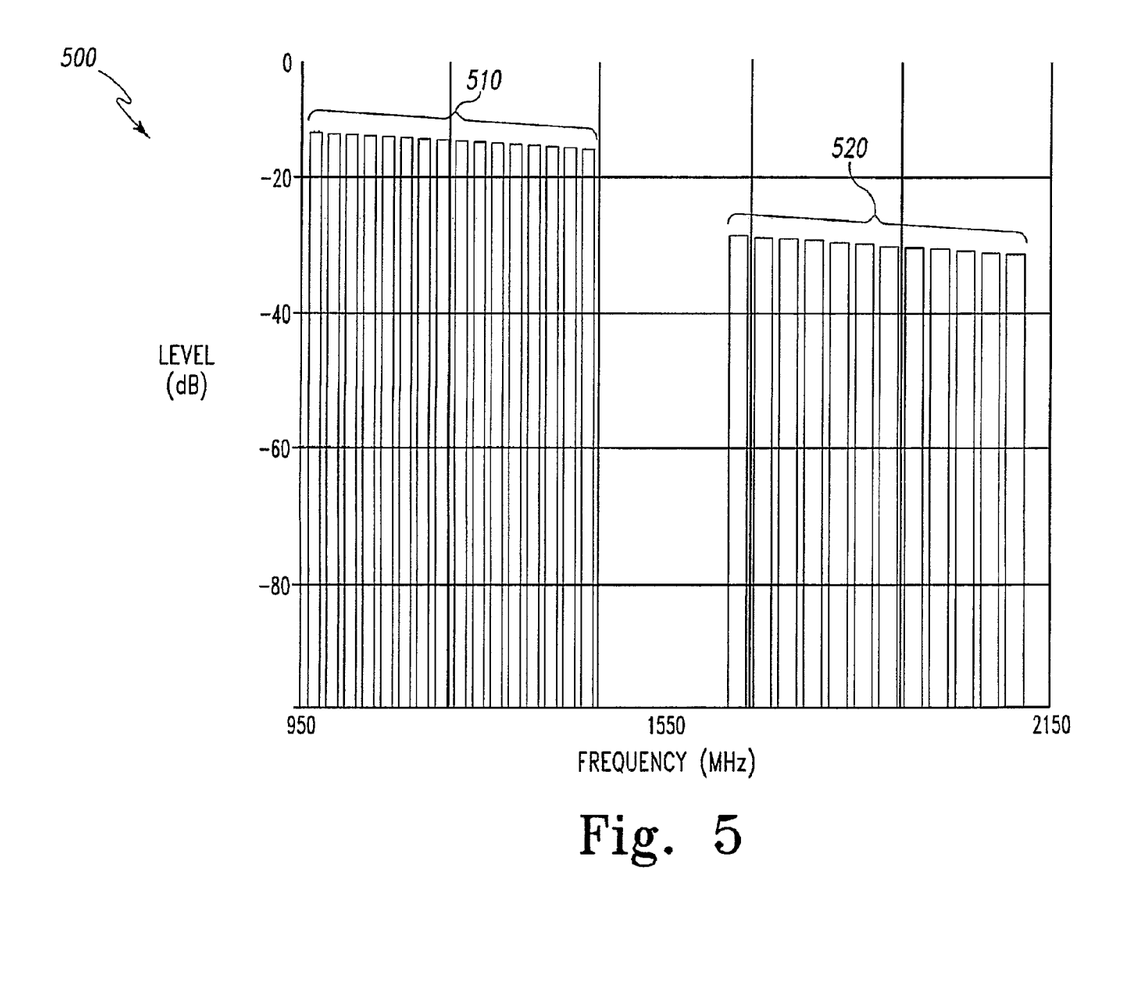
FIG. 5 is a graph showing the output signal of an embodiment of the present invention operating in one mode.

Turning to FIG. 5, a graph illustrating the signal at an output of power splitter 300 or power splitter 400 operating in nominal mode is shown. The x axis of the graph is frequency in MHz and the y axis signal level or amplitude shown on logarithmic dB scale. The signal is represented by groups of channels, 510 and 520, delivered from the satellite system to set top box 100 in the L-band frequency range covering 950 to 2150 MHz. The number of channels and the grouping of the channels may depend on the operation of a particular satellite system. In one embodiment, a first group of sixteen channels, 510, are delivered by transponders from a first satellite and provided to set top box 100 in a frequency region near the lower portion of the L-band frequency range. A second group of sixteen channels, 520, are delivered by transponders from a second satellite and provided to set top box 100 in a frequency region near the upper portion of the L-band frequency range.

The graph showing the output signal from power splitter 300 or power splitter 400 illustrates the difference in signal level, shown in a decibel (dB) scale for each of the two groups of channels 510, 520. The graph also illustrates the tapered signal level introduced by equipment connected to set top box 100 used to provide the signal and other circuitry in set top box 100.

Figure 6:
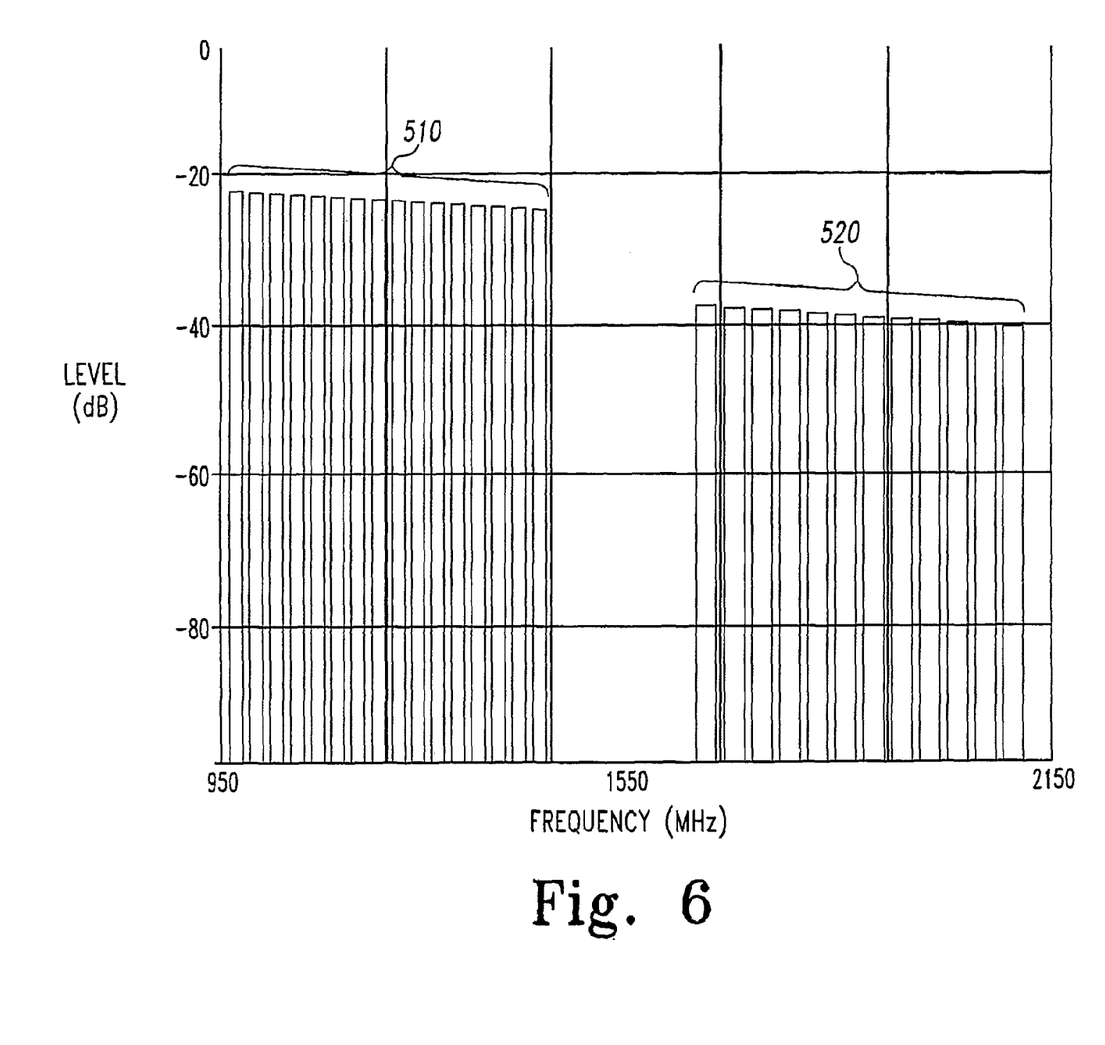
FIG. 6 is a graph showing the output signal of an embodiment of the present invention operating in another mode.

The graph in FIG. 6 illustrates the signal at an output of power splitter 300 operating in altered mode. The x axis, y axis, and groups of channels are the same as in FIG. 5. The addition of resistor 310 reduces the signal level of both groups of channels 510, 520 by approximately 9 dB uniformly across the L-band frequency range relative to the signal levels shown in FIG. 5.

Figure 7:
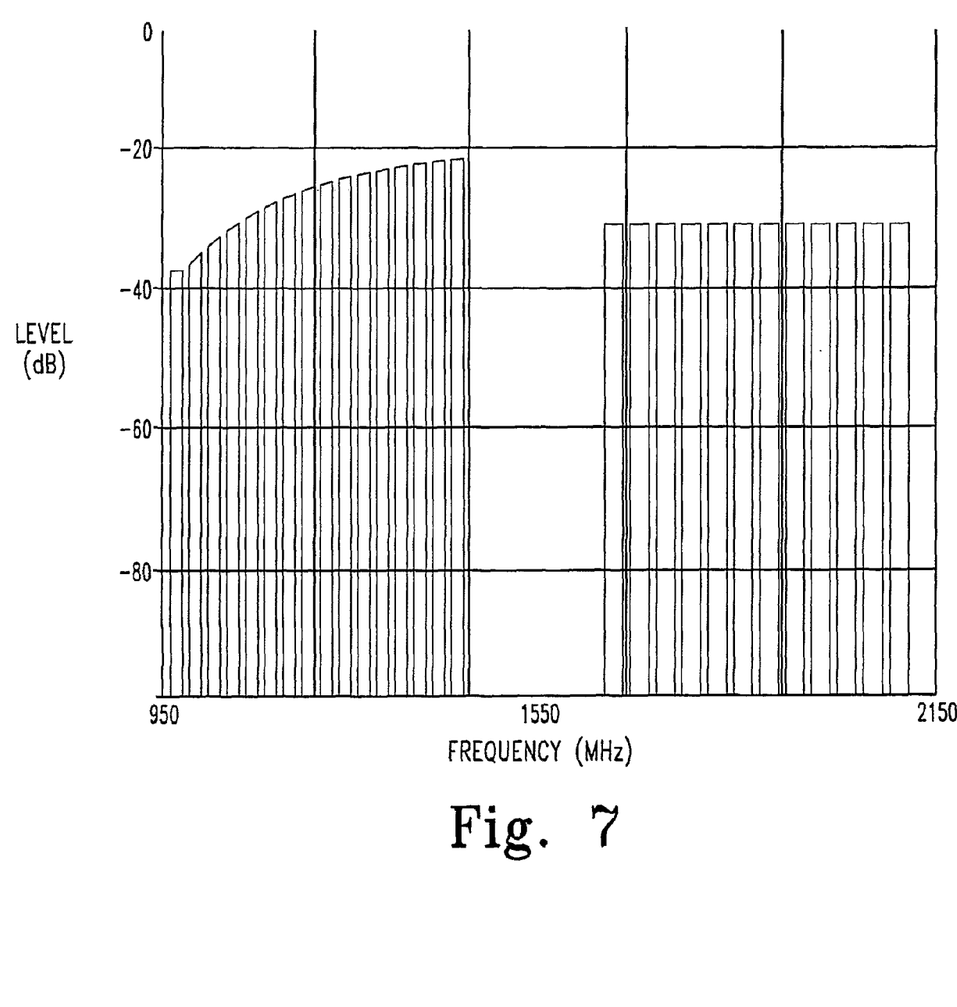
FIG. 7 is a graph showing the output signal of an embodiment of the present invention operating in another mode.

The graph in FIG. 7 illustrates the signal at an output of power splitter 400 operating in altered mode. The x axis, y axis and groups of channels are the same as in FIG. 5 and FIG. 6. The addition of inductor 410 forming a high pass filter frequency response in power splitter 400 provides a variable reduction in signal level across the L-band frequency range. The relative signal levels of the lower group of channels, 510, are reduced more than the upper group of channels, 520. Further the lower channels within the lower group of channels, 510, are reduced or attenuated by a greater level than the upper channels.

Figure 8:
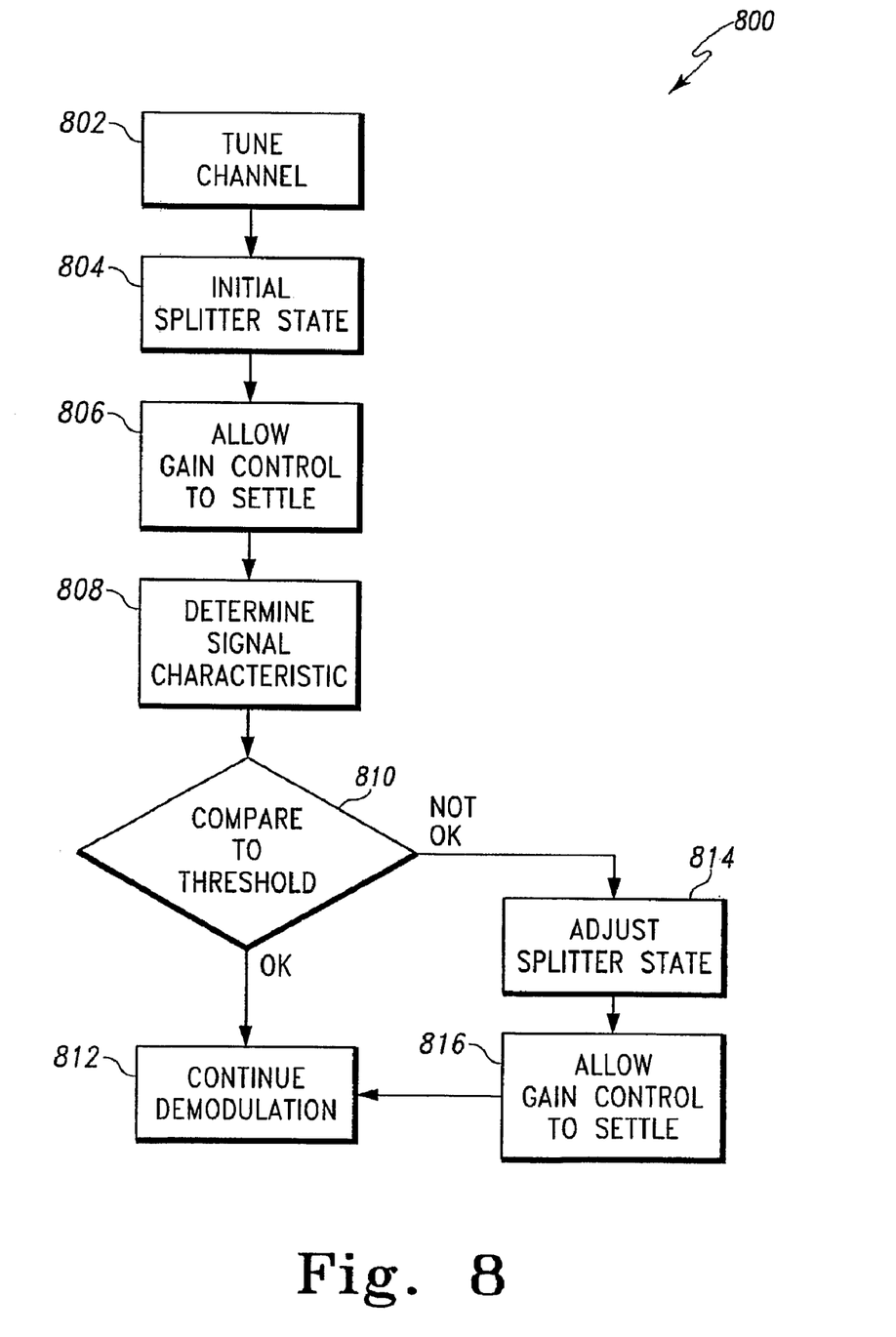
FIG. 8 is a flow chart illustrating an exemplary process of an embodiment of the present invention.

Turning to FIG. 8, a flow chart illustrating an exemplary process 800 of providing signal level control using aspects of the present invention is shown. Process 800 will described using blocks associated with the upper signal processing path in FIG. 1, however process 800 may apply to either or both of the processing paths in FIG. 1. At step 802, tuner 104 is commanded to tune a particular channel within the input signal stream provided to set top box 100. The tuning function is controlled based on inputs from a user that generate commands sent from controller 116 or subsequently from link circuit 106 to tuner 104. Step 802 includes sending the command and having tuner 104 translate the command in order to program a frequency adjustable oscillator used in the mixing or frequency conversion process within tuner 104. The actual frequency is tuned using a control loop such as a phase locked loop.

At step 804, initialization of splitting circuit 102 is performed. The initialization presets the operating mode for splitting circuit 102. For instance, splitting circuit 102 may be set for a nominal operation. In nominal operation, normal expected performance level of signal splitting circuit 102 is maintained and the normal transfer response characteristic is applied to signals passing through signal splitter 102. No additional frequency or amplitude level characteristic is introduced.

At step 806, the desired channel that has been tuned in step 802 is provided to link circuit 106 for processing and the gain control loop between link circuit 106 and tuner 104 is allowed to reach a final steady state value. The gain control loop may include one or more time constants in order to allow the gain control to reach a steady state value.

At step 808, after the gain control loop has reached a steady state value, signal characterization in link circuit 106 is used to determine the signal quality of the desired channel. Signal characterization may involve one or more measurements of parameters associated with analog or digital signals, such as signal level, signal to noise ratio, bit error rate, distortion, frame error rate, or equalizer efficiency. In addition, two or more of the parameters may be combined in a weighting function in order to improve the signal quality estimate over all possible signal conditions.

It is important to note that the signal quality may be impacted by a number of factors associated with the signal conditions, such as the amount of noise present, the number of channels, or the relative signal strength of channels other than the received channel in the signal stream.

At step 810, the signal quality value determined at step 808 is compared to a threshold signal quality value. The threshold signal quality value may be determined based on the required signal performance needed for proper signal demodulation and recovery and may be preset at the time of design or manufacture. In one embodiment for satellite signal reception, the threshold signal quality value is −45 decibels relative to one milliwatt (dBm). The threshold signal quality value may also be determined based on previous of operation of set top box 100 and previous signal quality values determined during operation. The threshold signal quality value may typically be programmed into a memory. The threshold signal quality value may be a single value for all channels that can be received from the signal stream, or may be different values for each channel.

If at step 810, the comparison of the signal quality value for the tuned desired channel to the threshold signal quality value indicates that the signal quality of the tuned desired channel is acceptable, no adjustment of the signal level control in splitting circuit 102 is necessary. At step 812, the process of demodulation and recovery continues in link circuit 106.

If at step 810, the comparison of the signal quality value for the tuned desired channel to the threshold signal quality value indicates that the signal quality of the tuned desired channel is not acceptable, then adjustment of the signal level control for splitting circuit 102 is made. At step 814, the control for adjustment signal splitting circuit is changed from the previous or initial state to a second or altered state. If the first or initial state did not introduce a frequency or amplitude adjustment, the second state may now introduce a response change to the signal transfer response characteristic. The response change may be in the form of a lowered signal level of the entire signal level resulting in a flat transfer response amplitude reduction applied to the signals passing through splitting circuit 102. The response change may be in the form of a frequency selective amplitude change such as a high pass filter transfer response characteristic applied to the signals passing through splitting circuit 102. At step 816, the gain control loop is allowed to settle to a final steady state and returning to step 812, demodulation and recovery of the signal tuned as the desired channel is continued in link circuit 106.

Alternatively, the process at step 816 may return to step 808 and repeat through the steps of determining and comparing a signal quality value to a threshold signal quality value using the second control setting. In this manner, the signal quality values for each control setting can be compared to the threshold, and additionally a comparison of signal quality of each control setting may be compared. The comparison may, for instance allow selection of the best control state for splitter circuit 102 even if both signal quality values were acceptable relative to the threshold signal quality value.

Figure 9:
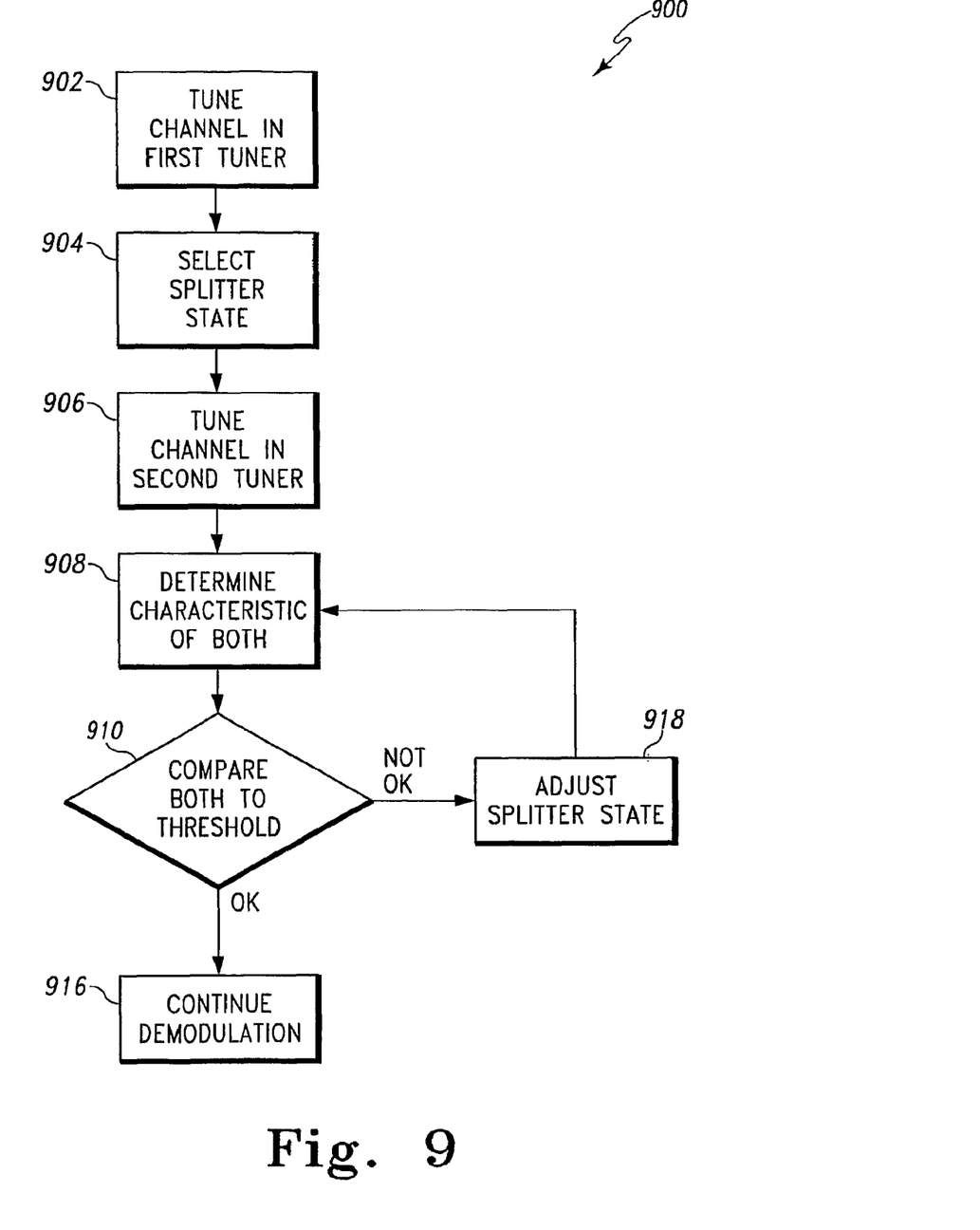
FIG. 9 is a flow chart illustrating another exemplary process of an embodiment of the present invention.

Turning to FIG. 9, a flow chart illustrating another exemplary process 900 of providing signal level control using aspects of the present invention is shown. Process 900 includes steps involving two tuners. The process can easily be expanded to include more than two tuners. Further some steps described in process 800 have been omitted but may be added back in to the process as necessary.

At step 902, the first tuner, such as tuner 104, is commanded to tune a particular channel within the input signal stream provided to the receiver. The tuning function in step 902 is similar to that described previously and will not be further described here. At step 904, the initial setting of splitting circuit 102 is determined. The initial setting may be a preset condition as described previously. For instance, the splitting circuit may be set for a nominal operation such that no additional frequency or amplitude level characteristic is introduced. The initial setting may alternately be determined by executing the steps of process 800 for the first tuner, tuner 104, and determining the value, for example that exceeds a threshold signal quality value.

Next, at step 906, the second tuner, such as tuner 110, is commanded to tune a particular channel within the input signal stream provided to the receiver. The tuning command is similar to that described previously. The second tuner may be tuned immediately after tuning the first tuner, for instance, when set top box 100 is initially turned on. The second tuner may also be tuned at a time much different from tuning the first tuner. For example, the second tuner may be tuned after completion of a current program, one hour after tuning the first tuner to a different program.

At step 908, signal characterization of both tuned channels using link circuit 106 and link circuit 112 is used to determine the signal quality of each tuned channel. A signal quality value for each signal is determined based on signal characterization techniques described previously.

At step 910, the signal quality value for each tuned channel determined in step 908 is compared to a threshold signal quality value. The threshold signal quality value may be determined as described previously and may be a different value for each tuned channel.

If at step 910, the comparison of the signal quality values for each tuned channel to the threshold value(s) indicates that the signal quality values of both of the tuned channels is acceptable, then at step 916, the process of demodulation and recovery continues respectively for each tuned desired channel in link circuit 106 and link circuit 112.

If at step 910, the comparison of the signal quality values for each tuned channel to the threshold value(s) indicates that the signal quality values of either or both of the tuned channels is not acceptable, then adjustment of the signal level control for signal splitting circuit 102 is made. At step 918, the control for adjustment of signal splitting circuit 102 is changed from the previous or initial state to a second state. The process then returns from step 918 to step 908 to determine signal characterization of each of the tuned channels again.

Alternatively, a second comparison may be made if at step 910, the comparison both of the signal quality values for each tuned channel to the threshold value(s) indicates that the signal quality values of both of the tuned channels is acceptable. The second comparison compares the signal quality value from the first tuned desired channel to the signal quality value from the second tuned desired channel. Further the comparison may include signal quality values for either tuned desired channel while the control for signal splitting circuit 102 is in either the first control state or the second control state. The signal quality values may be stored in a memory such as in memory 130, and retrieved as needed in order to allow comparison. In this manner, a control state may be chosen based on, for instance, which control state provides the highest performance for signal quality for both tuned desired channels simultaneously.

Although the steps shown represent steps in exemplary processes, it may be possible to omit some of the steps, or to combine or re-order some of the steps while not changing the overall function of the process. It may also be possible to determine certain signal conditions or operating scenarios, for instance, based on location in the country. Control information for splitting circuit 102 operation and the signal quality threshold values could be stored in memory during design or manufacture for these operating scenarios and the operation of splitting circuit 102 adjusted based on using the information provided for these signal conditions or operating scenarios. Further, although the embodiments describe only two control states for the control of signal splitting circuit 102, more than two control states may be possible by the addition of circuits in parallel.

Signal splitters are often required in order to provide signal to two or more tuners in a tuner system, and the addition of the signal splitter often requires the addition of an amplifier. The introduction of a splitter that allows modification of the signal transfer response characteristic based on signal condition introduces a low cost minimally complex solution to the problem of operating a tuner system using multiple tuners under difficult signal requirements.

While the disclosure may be susceptible to various modifications and alternative forms, specific embodiments have been shown by way of example in the drawings and will be described in detail herein. However, it should be understood that the disclosure is not intended to be limited to the particular forms disclosed. Rather, the disclosure is to cover all modifications, equivalents and alternatives falling within the spirit and scope of the invention as defined by the following appended claims.

What is claimed is:

1. A signal tuning apparatus comprising:
   a signal splitter for splitting signal power of a signal between an input and at least two outputs;
   a controller coupled to at least one output of said at least two outputs; and
   a circuit controlled by said controller and selectively coupled to said signal splitter, said circuit for altering a signal transfer response characteristic of said signal, wherein said signal transfer response characteristic of said signal is frequency response.

2. The signal tuning apparatus as in claim 1, wherein said signal splitter comprises three resistive elements connected at a common node.

3. The signal tuning apparatus as in claim 2, wherein said circuit is selectively coupled to said signal splitter at said common node.

4. The signal tuning apparatus as in claim 1, wherein said frequency response is a high pass frequency response.

5. The signal tuning apparatus as in claim 1, further comprising a first detector coupled to a first output of said at least two outputs and to said controller, wherein said first detector determines a signal quality value of said signal at said first output.

6. The signal tuning apparatus as in claim 5 wherein said circuit is selectively coupled by said controller in response to said first detector.

7. The signal tuning apparatus as in claim 6, wherein said controller compares said signal quality value to a predetermined value of signal quality.

8. The signal tuning apparatus as in claim 6, wherein said signal quality value is at least one of signal level, signal to noise ratio, and bit error rate.

9. The signal tuning apparatus as in claim 5, further comprising a second detector coupled to a second output of said at least two outputs and to said controller, wherein said second detector determines a signal quality value of said signal at said second output.

10. The signal tuning apparatus as in claim 9, wherein said circuit is selectively coupled by said controller in response to said first detector and said second detector.

11. The signal tuning apparatus as in claim 10, wherein said controller compares said signal quality value of said signal at said second output to said signal quality value of said signal at said first output and to a predetermined value of signal quality.

12. The signal tuning apparatus as in claim 1, wherein said circuit comprises at least one of a resistor, capacitor, and inductor.

13. A method for changing signal transfer characteristics using output signals of a signal splitter comprising the steps of:
    determining a first signal quality characteristic of a first output signal;
    altering a signal response in said signal splitter;
    determining a second signal quality characteristic of said first output signal in response to altering said signal response; and
    comparing said first signal quality characteristic to said second signal quality characteristic and to a predetermined signal quality characteristic threshold.

14. An apparatus comprising of:
    means for determining a signal quality characteristic of a signal; and
    means for altering a signal transfer response in a signal splitter in response to comparing said signal quality characteristic to a predetermined signal quality characteristic threshold, wherein said signal transfer response in said signal splitter is frequency response.

15. A method for controlling the signal level of signals outputted by a signal power splitter, comprising the steps of:
    determining a first signal quality characteristic of a first output signal; and
    altering a signal transfer response in said signal power splitter in response to comparing said first signal quality characteristic to a predetermined signal quality characteristic threshold, wherein said signal transfer response in said signal power splitter is frequency response.

16. The method of claim 15 further comprising the steps of:
    determining a second signal quality characteristic of a second output signal; and
    altering said signal transfer response in said signal power splitter in response to comparing said second signal quality characteristic to a predetermined signal quality characteristic threshold.

17. The method of claim 16 further comprising altering said signal transfer response in said signal splitter in response to comparing said first signal quality characteristic to said second signal quality characteristic.

18. The method of claim 15 wherein said signal quality characteristic is one of at least signal level, signal to noise ratio, and bit error rate.

* * * * *